United States Patent [19]

Weyandt

[11] 4,350,243

[45] Sep. 21, 1982

[54] CONTROL CIRCUITRY AND METHOD FOR VIBRATORY FEEDER

[75] Inventor: Ronald Weyandt, Chesterland, Ohio

[73] Assignee: Automated Packaging Systems, Inc., Twinsburg, Ohio

[21] Appl. No.: 250,179

[22] Filed: Apr. 2, 1981

Related U.S. Application Data

[63] Continuation of Ser. No. 53,104, Jun. 28, 1979, abandoned.

[51] Int. Cl.³ .................. B65G 27/24; H02K 33/14
[52] U.S. Cl. .................. 198/769; 198/757; 318/128; 318/132
[58] Field of Search ........... 198/753, 756, 757, 760, 198/761, 762, 769; 318/127, 128, 129, 130, 132; 222/63; 73/664, 668, DIG. 3

[56] References Cited

U.S. PATENT DOCUMENTS

| | | | |
|---|---|---|---|
| 2,322,217 | 6/1943 | Baird | 318/128 |
| 2,366,075 | 12/1944 | Weyandt | 318/132 X |
| 2,885,617 | 5/1959 | Kast et al. | 318/128 |
| 2,935,671 | 5/1960 | Ross | 318/128 |
| 3,056,910 | 10/1962 | Hajian | 318/128 |
| 3,080,961 | 3/1963 | Allen et al. | 198/753 |
| 3,286,528 | 11/1966 | Julien-Davin | 73/DIG. 3 X |
| 3,331,239 | 7/1967 | Larsen et al. | 318/128 X |
| 3,504,250 | 3/1970 | Stevens, Jr. et al. | 318/132 X |
| 3,519,907 | 7/1970 | White et al. | 318/132 X |
| 3,648,136 | 3/1972 | Krajewski et al. | 318/132 X |
| 3,748,553 | 7/1973 | Reiner | 318/128 |
| 4,053,817 | 10/1977 | Yeasting | 318/128 |

*Primary Examiner*—Robert J. Spar
*Assistant Examiner*—Edward M. Wacyra
*Attorney, Agent, or Firm*—Watts, Hoffmann, Fisher & Heinke Co.

[57] ABSTRACT

A material dispensing apparatus including drive structure for driving a feeder bowl is disclosed. A control circuit for controlling the drive includes a Hall effect amplitude sensing transducer for monitoring the magnitude of bowl vibrations and a braking circuit for controlling the damping of vibratory motion after the requisite amount of material has been fed from the feeder bowl. The braking circuit selectively reverses the current flow through a drive coil which comprises a portion of the drive circuitry of the apparatus. This current reversal disrupts the rhythm of forced oscillations which feed material from the bowl and causes bowl motion to be damped.

10 Claims, 12 Drawing Figures

CONTROL CIRCUITRY AND METHOD FOR VIBRATORY FEEDER

This is a continuation of application Ser. No. 053,104 filed June 28, 1979 now abandoned.

BACKGROUND OF THE INVENTION

1. Field of the Invention

The invention relates generally to a vibratory feed mechanism, and in particular, to a feed mechanism which includes an improved amplitude sensing and damping method and apparatus.

2. Prior Art

Systems including vibratory feeder bowls are known for feeding streams of parts or other particulate material. Such a system typically includes a feeder bowl coupled to a stationary base by leaf springs. Relative movement of the bowl and base causes parts within the bowl to move up an incline spiral path and fall into an accumulating container.

In a typical system parts segregated by a vibratory feeder bowl are either weighed or counted to collect a batch of a desired size. Once the batch is complete, the parts are either moved away from the feeder by a conveyor system or are dumped from a first accumulator to a second receptacle and then removed.

As an example, three vibratory feeder mechanisms might be arranged in parallel. A first mechanism would deposit a desired number of bolts onto a conveyor. The second and third feeder mechanisms would send an identical number of nuts and washers to the conveyor to be added to the bolts provided by the first mechanism. In this way a like number of nuts, bolts and washers will be fed from individual vibratory mechanisms and combined to form a batch each containing the proper number of parts. Typically they are then fed to a packaging station.

As the parts are dispensed from the feeder bowl it is desirable that the amplitude of vibration of the feeder mechanism remain approximately constant. It is known that the amplitude of bowl vibration depends upon the mass of materials within the bowl. As the total mass of the bowl contents decreases, a reduction in driving power is necessary to maintain a given amplitude of vibration for the bowl. As the amount of bowl contents increases, the amplitude of vibration will diminish for a given driving power. Proposals have been made to sense the amplitude of vibration of the driven bowl and compensate for changes in the bowl by varying the power acting upon the bowl. The objective of such proposals is to maintain relatively constant vibratory amplitude while parts are being fed to an accumulator.

Prior amplitude sensing techniques have employed inductive elements mounted to the feeder in close relation to a magnet which vibrates with the feeder bowl. As the bowl vibrates, thereby feeding parts in the bowl to a conveyor or packaging station, relative motion between the magnet and an inductor produces an oscillating electrical signal whose magnitude depends upon the amplitude of vibration. This signal has been used to sense the amplitude and control the driving power to the bowl. At small amplitudes of vibration, however, the signal generated in this manner was too small to provide an adequate control signal.

A small amplitude of oscillation is particularly useful in small batch processing where a large amplitude is inefficient since the feeder is continually being started and stopped. Thus, prior art amplitude sensing techniques has been somewhat inadequate when controlling the feeding of small batches of parts.

Another problem with prior vibratory bowl feeders is that they are characterized by inefficient batch feed through due to problems encountered stopping vibrations when a batch has been completed. Prior systems count the number or weigh the mass of units fed from the bowl and seek to terminate the drive power to the bowl when the proper number or weight of units has been fed. A problem has been that when the power has been removed from the driving circuitry, the bowl continues to oscillate or vibrate for a finite period of time due to its inertia and the restoring action of its coupling leaf springs. As the bowl continues to vibrate, the units within the bowl may continue to be fed from it and accumulate in the container. Thus undamped oscillation after power termination may send more than the requisite number of units into an accumulator or container.

Expressed another way, one problem has been that prior feeders tend to over feed. Various expedients have been used to compensate for the over feed problem but the problem itself has continued.

Some prior art systems have dealt with the over feed problem by including a diverter into which the excess parts were fed after forced bowl vibrations were terminated. The excess parts were accumulated and periodically emptied back into the vibratory feeder bowl. These diverter systems were inefficient since the excess parts must be continually returned to the vibratory apparatus and they exhibited other shortcomings. One such shortcoming was repeated recycling could cause excessive wear with some parts and another shortcoming was the diverter would not neccessarily provide the precise flow cut off desired.

A second technique for dealing with the over feed problem was to slow down the oscillations as the requisite number of parts was neared during the feed process. This slowing down of the vibration as the correct part number was neared resulted in a reduced through put for the system. Instead of operating at maximum efficiency for the full cycle for a given batch, the oscillations were slowed as the proper count was neared. This technique also required control circuitry to monitor the number of parts in the accumulator and compare that number with the final count to be achieved.

SUMMARY OF THE INVENTION

The present invention obviates the need for a diverter or other type of over feed compensation and includes an improved amplitude of oscillation sensing technique. The result of these innovations is a maximum through put of parts. A stopping or braking mechanism of increased efficiency is provided which applies a damping force to the feeder's vibratory bowl. The damping force causes the bowl to stop vibrating more rapidly than prior art systems. The bowl can be driven close to maximum speed until the proper article count or weight has been accumulated. An increase in efficiency of the order of 40 to 50% can be achieved when article batches of small quantity are fed by the system. An amplitude control signal is generated which results in an adequate control signal at all amplitudes of oscillation and in particular for low level oscillation used in small batch feeding.

A typical dispensing apparatus embodying the present invention includes a drive means for vibrating a bowl mechanism which in turn imparts motions to a unit or part to be counted. Apparatus of the present invention further includes a control circuit which carefully monitors the amplitude of oscillation and applies a braking force when the vibrating power is turned off.

More particularly, the control circuit includes a speed control circuit for controlling oscillation of the bowl. An amplitude sensing circuit which comprises a Hall effect transducer is included for monitoring the bowl oscillations and which in conjunction with a control circuit signal maintains oscillation amplitudes in a preferred range. A power circuit receives a control signal from the amplitude sensing circuit and produces a driving signal to a bowl coil. Energization and de-energization of this bowl coil produces movement of the vibratory bowl due to electromagnetic interaction between a stationary and moving portion of an electromagnetic system.

The control circuit also includes a braking circuit for reversing the current within the power circuit and thereby reversing the direction of oscillation inducing force applied to the bowl. This current reversal achieves a rapid braking of the vibrating bowl mechanism and thereby minimizes the over feed problem.

In a preferred embodiment, the braking circuit sends a timed braking signal to the power circuitry. This signal causes the bowl to be driven but in a timing sequence which disrupts the original oscillations. The braking circuitry further includes control circuitry which is used to fine tune the braking circuit to provide the braking signal to the bowl mechanism for only a certain time period.

The power circuit of the preferred embodiment includes controlled rectifiers for sending power signals to the bowl coil. A gating signal allows current to flow in these controlled rectifiers in response to control signals from the speed control and braking circuits. When the bowl is driven during normal feed operation, a first controlled rectifier is periodically rendered conductive in response to signals from the speed control circuit. When controlled braking is to be applied, a second controlled rectifier in the power circuit is rendered conductive by an input from the braking circuit.

From the above it is apparent that one important feature and object of the present invention is to provide a damping or stopping signal to a driven vibratory feeder mechanism. In this way a more efficient counting mechanism is provided without the use of diverter or other excess unit compensation techniques. The system vibrates at a constant frequency of oscillation throughout its batch processing and is rapidly stopped when a batch of parts has been dispensed.

A further objective is an amplitude sensing circuit which accurately transmits amplitude data to the power circuit. This improved amplitude sensing is more accurately representative of the amplitude than prior art amplitude sensing techniques. These and other features and objects of the invention will be better understood when considered in conjunction with the detailed description of the invention and the accompanying drawings.

DETAILED DESCRIPTION OF THE INVENTION

Figure 1:
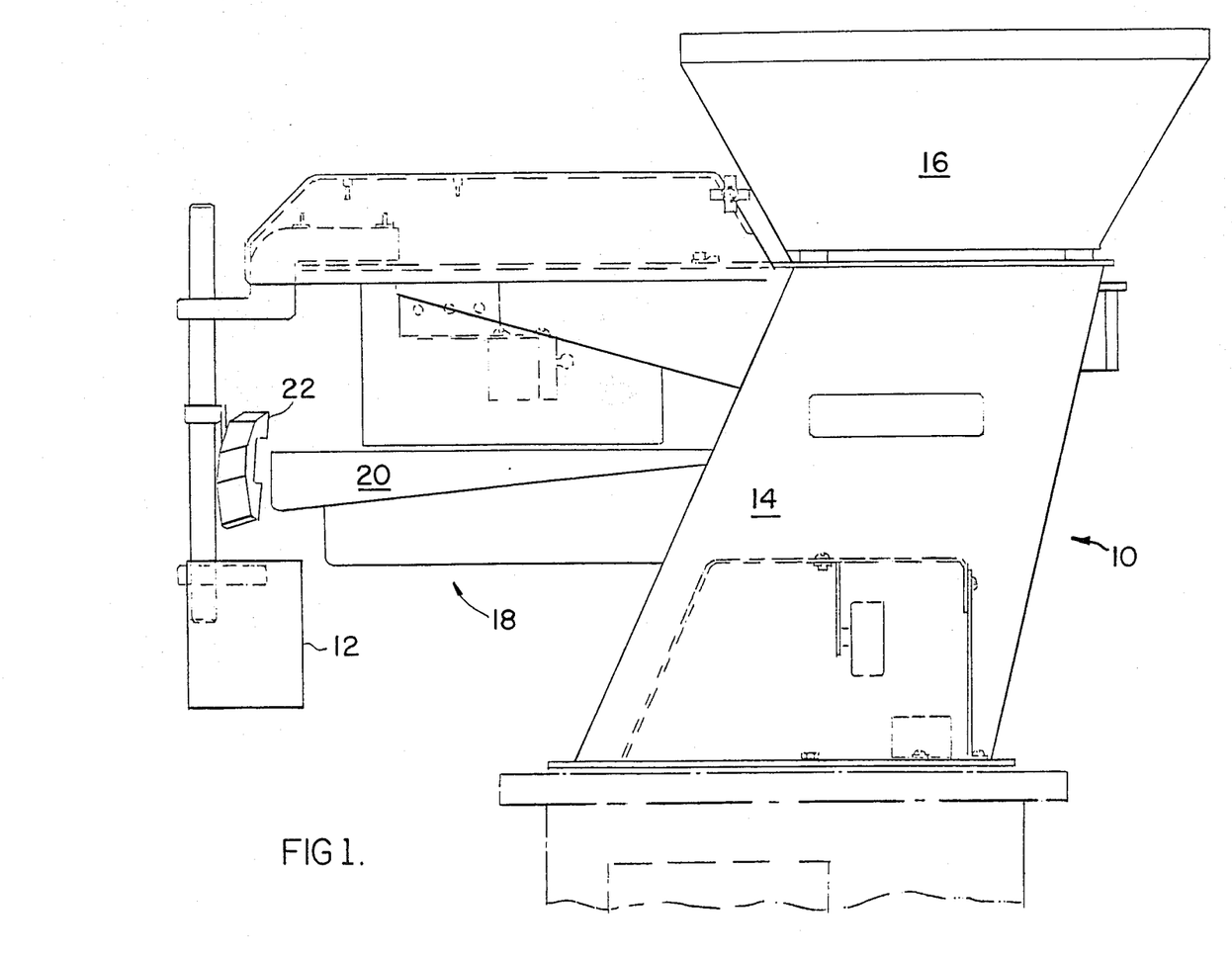
FIG. 1 is a side view of material handling apparatus embodying the present invention.

Referring to FIG. 1, a material dispensing apparatus using the preferred embodiment of the present invention is indicated generally by the numeral 10. The apparatus 10 is operative to dispense articles, such as pills, washers, screws, or other small items into a container 12 positioned next to the article handling apparatus 10.

The apparatus 10 includes a base structure 14 which supports a supply hopper 16, and a vibratory feeder 18. The vibratory feeder 18 includes a feeder hopper or bowl 20 which deposits the units into the container 12. In operation, articles to be dispensed are loaded into the supply hopper 16. The material dispensing apparatus then feeds controlled amounts of articles from the supply hopper 16 into the feeder 18. Vibratory motion of the feeder causes the articles to move from the feeder 18 into the accumulator bucket or container 12. A limit switch assembly (not shown) maintains a predetermined amount of articles in the feeder 18 by controlling article movement from the supply 16 to the feeder 18.

The operation of the vibratory feeder can be controlled by an external signal from a counting unit 22. This signal will automatically control the dispensing of a predetermined amount or weight of articles into the accumulator or container 12. After the required number of articles have been accumulated, the article dispensing apparatus 18 is turned off and motion ended by means of the braking system embodied by the present invention.

Further details of a preferred vibratory accumulator unit as embodied by the present invention can be found in U.S. Pat. No. 4,095,723, columns 11, et. seq. which has been assigned to Automated Packaging Systems, Inc., the assignee of the present invention. This patent is specifically incorporated by reference.

Figure 2:
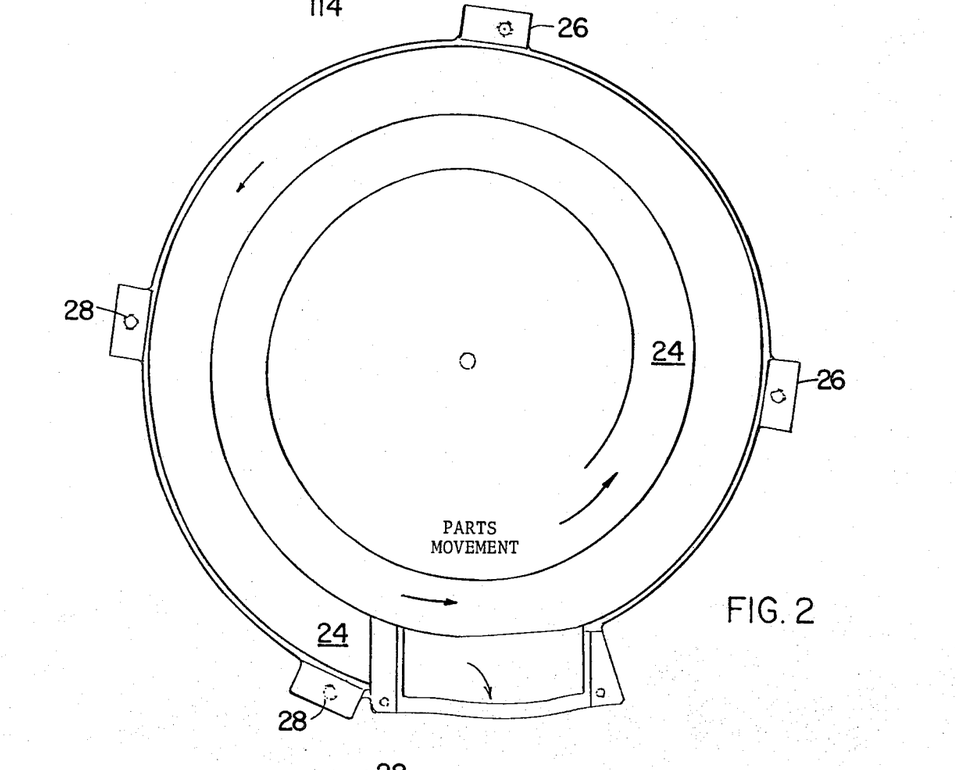
FIG. 2 is a top plan view of a vibratory feeder bowl.
Figure 3:
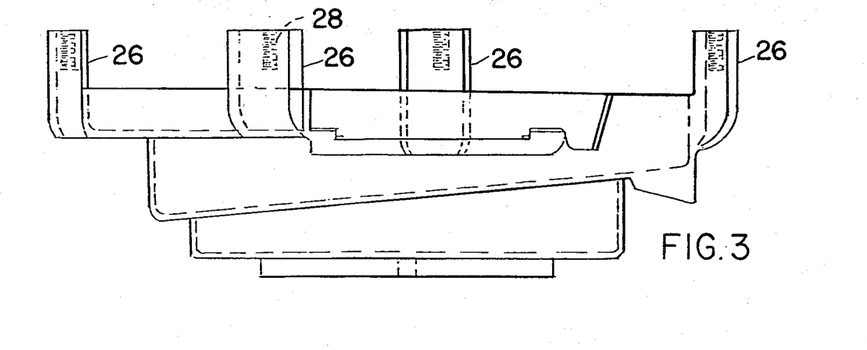
FIG. 3 is a side plan view of the bowl illustrated in FIG. 2.

Referring now specifically to FIGS. 2–5, it is shown how the present apparatus produces a vibratory movement to propel articles to be accumulated along an spiral path in the bowl 20. More specifically, FIGS. 2 and 3 depict a vibratory feeder bowl 20 used for accumulating the parts to be counted once they are dumped from the feeder hopper 16. The parts are deposited in the bowl 20 and are caused to vibrate in a spiral path 24 until they reach the end of that path and are dumped from the vibratory bowl into the container 12. As seen in FIGS. 2 and 3 the vibratory bowl includes 4 flange elements 26 spaced at well defined locations about the periphery of the feeder bowl. Each of these flanges includes a threaded aperture 28 for receiving a connector which mounts the vibrating bowl to an oscillating arm 44 (see FIGS. 4 and 5). In this way, the vibratory bowl is suspended from the arms and, as will be seen with reference to FIGS. 4 and 5, can be caused to oscillate to create movement in the parts along the bowl's path 24.

Figure 4:
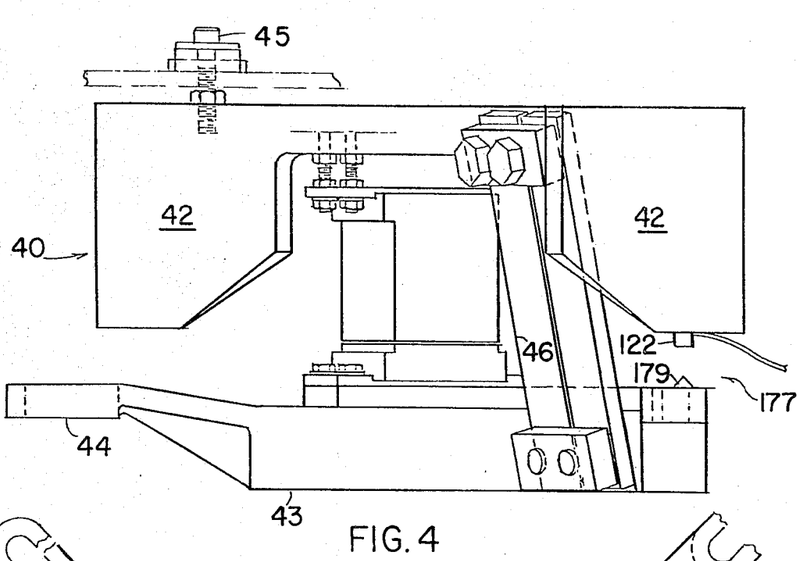
FIG. 4 is a side view depicting a mounting mechanism for the feeder bowl.
Figure 5:
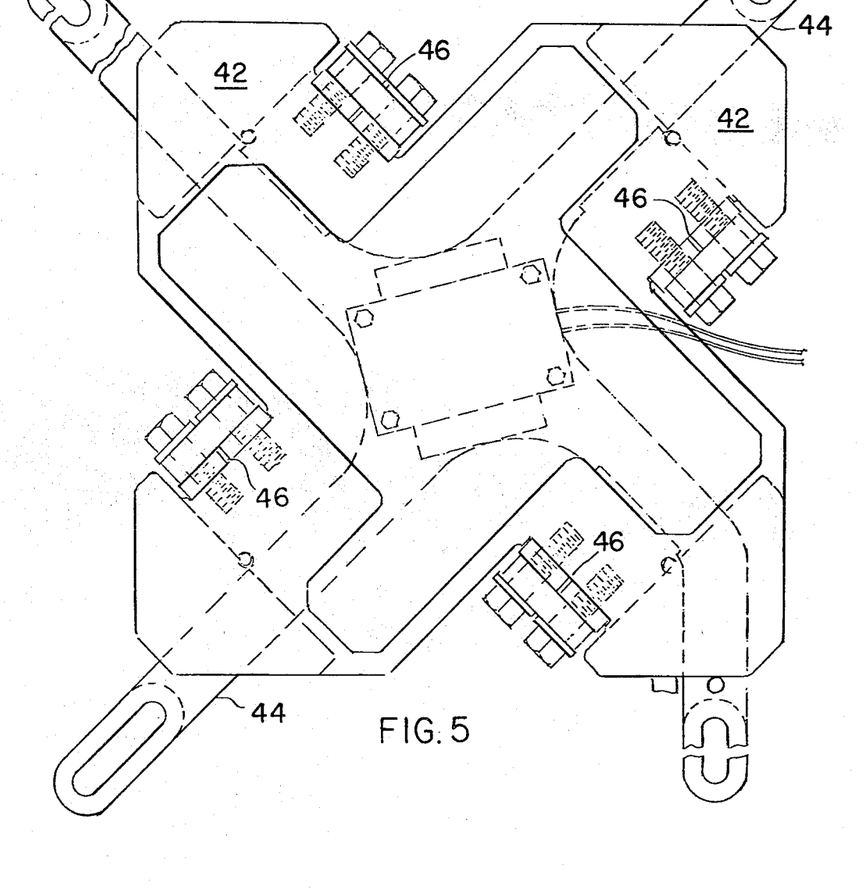
FIG. 5 is a top plan view of the mechanism of FIG. 4.

Referring now to FIGS. 4 and 5, apparatus for oscillating the bowl is referred to generally by reference numeral 40. This apparatus 40 includes a massive supporting frame element 42 and a much lighter suspended element 43 including the arms 44 which extend generally radially. The radially extending arms 44 include apertures which align with the apertures 28 in the flanges 26. Bolts, now shown, threaded into the apertures 28 join the vibratory bowl with the radially extending arms. The element 42 is suspended from the frame of the dispenser 10 by bolts 45 which thread into apertures in the frame element 42.

The suspended element 43 is suspended from the support element 42 by means of flexible leaf springs 46. As seen in FIG. 4, the leaf springs are attached to the support element 42 and suspended element 43 by means of suitable connectors which in a preferred embodiment comprise a threaded bolt arrangement. The leaf springs 46 are angled with respect to the vertical in such a way that relative vertical motion between the radially extending arms 44 and the support element 42 will produce a circular oscillatory movement of the radially extending arms and the attached bowl.

Relative vertical motion between the support element 42 and the arms 44 is achieved by means of an electromagnetic motor which utilizes conventional I and E laminations. The E laminations are mounted to the supporting element and the I laminations to the radially extending arms. Energization of the E laminations causes a relative motion due to the changing flux which energization produces. This flux interacts with the I laminations causing electromagnetic forces to be created between the two halves of the motor. These forces cause the radially extending arms to move vertically relative to the supporting element 42. This motion is caused by the attraction of the I laminations to the field produced in the E laminations.

Due to the angled mounting of the leaf springs 46, the vertical movement caused by the electromagnetic interaction becomes a combined, relatively slow, circular and vertical movement. When the magnet is deenergized, energy stored in the springs rather suddenly drives the bowl down and in the opposite circular direction. Inertia of parts along the spiral bowl ramp causes them to "climb" the ramp when the bowl is spring driven. This climbing causes the parts located within the bowl to move along the spiral bowl ramp and drop into the accumulating container shown in FIG. 1.

During normal operation, oscillatory forces are applied to the bowl by alternate energization of the electromagnet. During the energization, current passes through a bowl coil 112 which wraps around the E laminations of the magnet. The resultant electromagnetic force between the I and E laminations reduces the distance between the base and radial arms. When current is removed from the bowl coil, the restoring action of gravity and the leaf springs increase the gap between the base and arms. The cyclical energization and deenergization of the coil results in up and down oscillatory movement which inputs spiralling oscillations to the bowl.

Figure 6:
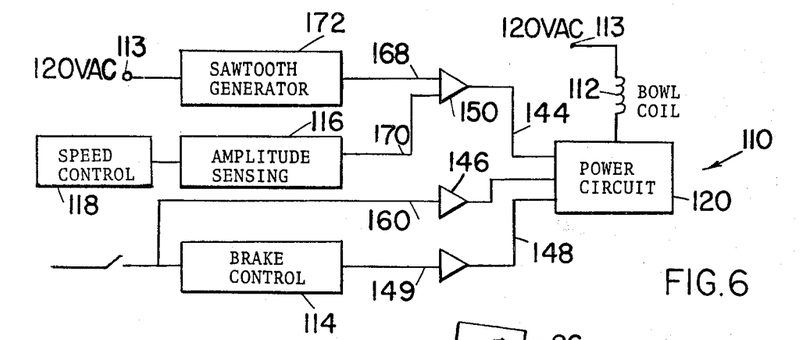
FIG. 6 is a schematic of a control circuit for controlling the vibration of the feeder bowl.

The bowl oscillations are controlled by a circuit 110 schematically illustrated in FIG. 6. One aspect of this circuit is the modulation of the amplitude of oscillation response to the weight of parts carried by the vibratory bowl. When the bowl is relatively full, more power must be supplied to the electromagnetic motor to achieve the same amplitude of vibration. A second aspect of the disclosed circuit is to provide a braking signal to the electromagnetic motor when an appropriate number of parts have been dispensed. Were it not for this braking signal, the vibratory bowl would continue to oscillate with a natural undamped frequency which would cause excess parts to be dispensed. This cause of inaccuracy has substantially been eliminated by means of the unique and novel braking technique.

The control circuit comprises a power circuit 120 which allows current to flow through a bowl coil 112. The coil 112 is driven by a source of energy 113 which in one embodiment comprises a 120 volt alternating current source of 60 cycles per second. Since the blow coil 112 wraps around the magnet's E laminations, energization and de-energization of the coil causes the bowl 20 to vibrate due to the mechanical structure of the bowl support. As described hereinafter the power circuit 120 controls the timing and direction of current flow through this bowl coil.

The control circuit 110 further includes a speed control circuit 118, an amplitude sensing circuit 116, and a braking circuit 114 which in combination control energization of the bowl coil 112 through operation of a power circuit 120. The amplitude sensing circuit 116 and speed control circuit 118 are connected in series and generate an output 170 proportional to both a desired speed of operation and the actual amplitude of vibration of the bowl feeder. This signal is compared to a sawtooth voltage signal by a comparator 150 which produces an input 144 to the power circuit. The status of this input 144 determines the amount of power transmitted through the bowl coil 112 by the power circuit 120. The amplitude sensing circuit 116 includes a Hall magnetic transducer 122 (see FIG. 7) which provides an oscillating signal proportional to the amplitude of oscillation imparted to the bowl mechanism. The Hall transducer 122 also receives a signal from the speed control circuit which modulates the output from the amplitude sensing circuit to the comparator 150. In this way, a feed back signal is generated which is dependent on both the amplitude of feeder oscillation and to a desired speed control signal from the speed control circuit.

The comparator 150 selectively renders conductive a switching means such as a silicon control rectifier 130 (See FIG. 7) within the power circuit. When the silicon control rectifier is rendered conductive, it allows the alternating current source 113 to drive the bowl coil 112 for a controlled time period. The control from the speed control circuit is modified in response to the amplitude of vibration as sensed by the Hall effect transducer 122. As a result, a combined speed and amplitude control technique is achieved for controlling the amount of power sent to the bowl coil 112.

The braking circuit deactivates signals from the comparator 150 by controlling a second input 146 to the power circuit 120. When a signal voltage input to the braking circuit drops in response to a counter or switch, the driven oscillation of the bowl is terminated. To damp continuing oscillations, the braking circuit produces a signal 148 which is sent to the power circuit 120 causing alternating current to pass through the bowl coil 112 but in a direction opposite to the direction of current flow during normal bowl oscillation. This reversing of bowl coil current flow causes the bowl to be damped much more quickly than it would if the power were merely removed from the coil. The reverse current signal is maintained for enough oscillations to damp the bowl mechanism but to not overdrive the mechanism in an opposite direction. The correct timing of this damping function is achieved via a tuning of components within the braking circuit 114.

Figure 7:
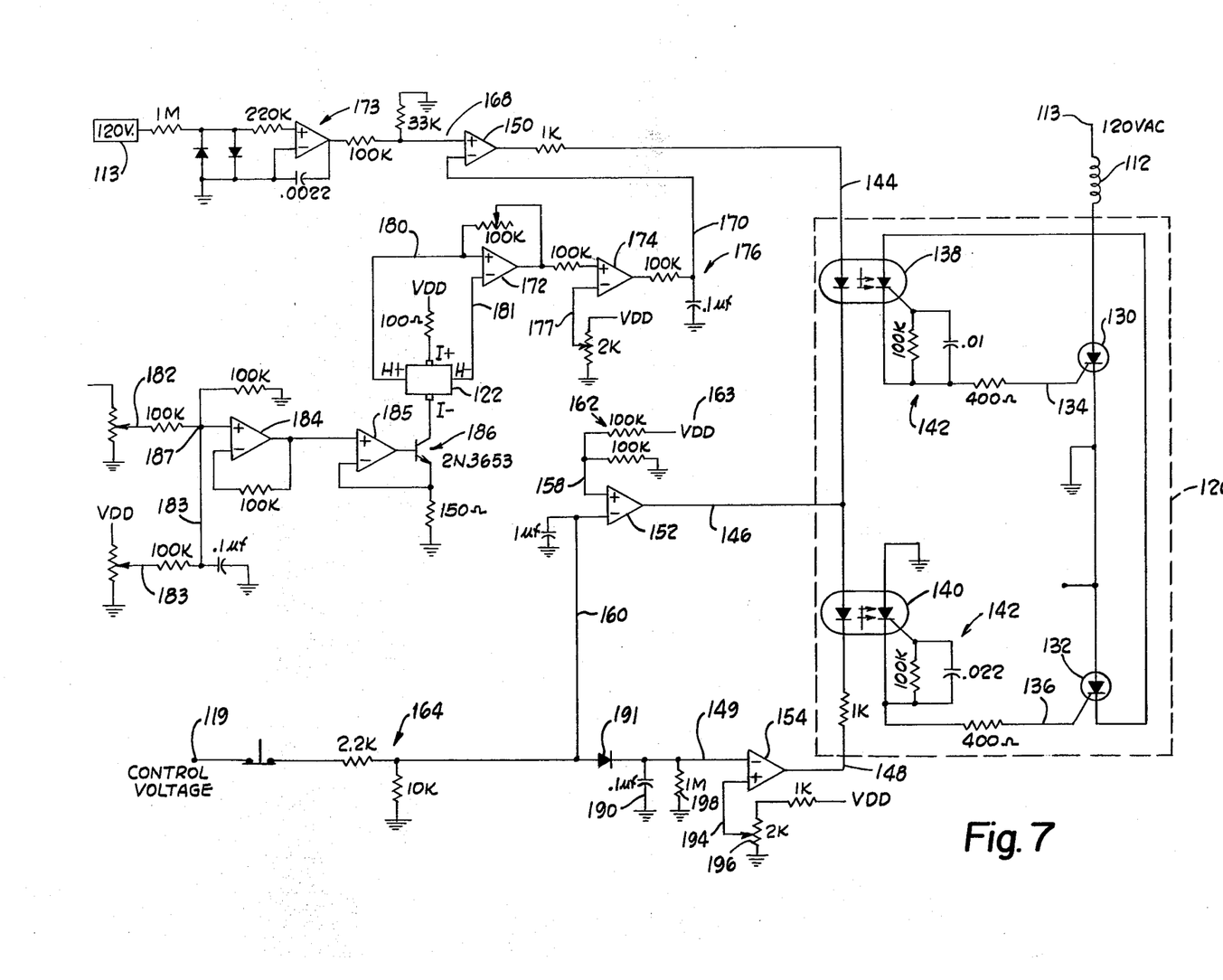
FIG. 7 is a more detailed schematic of the control circuit shown in FIG. 6.

A detailed schematic of the control circuit is illustrated in FIG. 7. Unless otherwise noted, all resistors are ¼ watt resistors and all capacitors are indicated in micro farads. Many of the elements within the circuitry are chosen for convenience but it should be appreciated to those skilled in the art that certain design modifications could be made in the resistor or capacitor values without departing from the spirit of the invention.

As seen in FIG. 7, current flow through the coil 112 is controlled by the power circuit 120 which includes two silicon control rectifiers 130, 132. Depending on the conduction states of these two rectifiers, current can flow through the bowl from the 120 volt source in one of two directions. During normal vibratory operation (i.e., when parts are to be moved along the spiral ramp) a drive SCR 130 will allow conduction through the bowl in one direction. The other SCR 132, which will be referred to as a braking SCR, will be rendered nonconductive so the bowl coil will be energized during only a maximum of one half the alternating current cycle. During the half cycle the drive SCR may not conduct, the bowl will be driven in an opposed direction by the combined action of the leaf springs and gravity as noted previously.

When the requisite number of parts have been accumulated or the proper weight of parts dispensed, the drive SCR 130 is rendered nonconductive and the brake SCR 132 is rendered conductive for a brief period of time to dynamically brake the bowl by allowing a back current to flow through the bowl coil in a direction opposite to its part feed flow. This back current disrupts the rhythm of oscillations produced by action of the drive SCR 130 and quickly brakes the bowl. No excess units or parts are dispensed by continued vibration of the bowl and unlike some prior art systems during the bowl drive portion uniform frequency and amplitude of bowl oscillation is maintained.

Gating inputs 134,136 to the two SCR's 130, 132 are respectively connected to a pair of optically coupled SCR's 138, 140. When these optically coupled SCR's conduct, gating signals are sent to the SCR's 130, 132. This connection is achieved through filter circuits 141 which suppress transient signals from reaching the SCR gates 134, 136. Each of the optically coupled SCR's provides a signal to its connected one of the gates 134, 136 in response to the voltage on three inputs 144, 146, 148 to the power circuit 120. The relative size of the signals on these three inputs is controlled by operation of the speed control 118, amplitude sensing 116, and brake control 114 circuits. These control circuits will be described in detail but it should be clear from the schematic of the power circuit that one optically coupled SCR 138 will conduct whenever the input 144 is greater than the second input 146 and that the second optically coupled SCR 140 will conduct and therefore turn on the brake SCR 132 whenever the second input 146 is greater than the third input 148. It is control of the three inputs which determine how the vibratory bowl is driven and damped.

As seen in FIG. 7, the voltage levels at the three inputs 144, 146, 148 are respectively controlled by the output of three amplifiers 150, 152, 154. Each of these amplifiers is configured to operate as a comparator in that the output of each comparator is dependent upon the relative size of its two inputs. The inputs to each of the three amplifiers or comparators 150, 152, and 154 change in response of operation of the three control circuits 114, 116, 118.

One midpoint amplifier 152 transmits an input 146 midway between the two optically coupled SCR's 138, 140. During normal powered operation of the vibratory bowl, this input 146 is maintained at a low or ground potential. This state is achieved through control of the amplifier's two inputs 158, 160. A first input 158 is maintained at a reference voltage of about 5 volts by a voltage divider 162 and a 10 volt power source 163. A second input 160 is maintained at an approximately 10 volt level due to connection to a second voltage divider 164 and a 12 volt control voltage 119. During normal operation of the vibratory feeder system, a set up switch is in a closed position. This enables the 12 volt control source to maintain the input 160 to the midpoint amplifier 151 at a value of approximately 10 volts. When this input is compared to the 5 volt input on the other input 158, a low or ground output 146 is sent between the two optically coupled SCR's 138, 140.

When the control voltage 119 drops below 5 volts, the forced vibration of the bowl is stopped due to the change in output by the midpoint amplifier 152. When the input 160 is compared to the positive 5 volt voltage on the other input 158, the output 146 changes from its low ground state to its high state. In this configuration, no current may pass through the optically coupled SCR 138 which as a result sends no gating signals to the bowl drive SCR 130. Thus, when the control voltage 119 is low the bowl drive SCR 130 is maintained in a nonconducting state and the bowl drive vibrations are removed.

When the control voltage 119 is high, the optically coupled SCR 138 may or may not conduct depending on the state of a second input 144 to the power circuit. If the input 146 is in a low state, the optically coupled SCR 138 conducts so long as the input 144 from the first or drive bowl comparator 150 is in a high or positive state. In this configuration, power will flow through the optically coupled SCR 138 sending a gating signal to the drive bowl SCR 130.

The comparator 150 has two inputs 168, 170 whose voltage dictates whether the output 144 is in a high or low state. One input 168 to the comparator 150 is a reference signal and is a sawtoothed waveform. A conventional 120 volt alternating current input 113 is shaped into a sawtoothed waveform by a sawtooth generator 173 to form this sawtooth waveform input 168.

A second input 170 to the comparator 150 is generated by the amplitude sensing circuit 116. This circuit comprises a Hall effect transducer 122, a differential amplifier 172, a comparator 174, and an intergrating circuit 176.

The Hall effect transducer 122 has two outputs 180, 181 attached to the differential amplifier 172. The voltage difference between the two Hall effect outputs is proportional to a product of a control current flowing through the device and to a magnetic field component normal to an active region on the Hall effect transducer. Since the output from the Hall device is dependent on two variables, it can be utilized as both a speed control and amplitude sensing device. The current through the Hall device is modified to affect a speed control and mounted to the vibratory feeder in close proximity to a magnet to achieve an amplitude sensing capacity.

As seen in FIG. 4 the Hall sensor is attached to the base support 42 in close proximity to a magnet 179. Bowl oscillations bring the magnet closer to the Hall transducer, thereby increasing the magnetic flux impinging upon the transducer surface. Since the voltage of the two outputs 180, 181 is dependent upon the magnetic field component impinging upon this surface, the amplitude of bowl vibrations is reflected in the voltage appearing at the two inputs to the differential amplifier 172.

The speed control circuit 118 is also electrically connected to the Hall transducer 122 and serves to modify the current flow in the device. In the preferred embodiment of the speed control circuit a N-P-N transistor 186 is used as the current control device. That transistor's collector is attached to the Hall transducer and by modification of the base voltage appearing on the transistor current flow through the Hall device can be increased and decreased. By increasing the current flow greater amplitude of oscillation are achieved and conversely a decrease in the current flow in the Hall device results in lower amplitude of oscillation.

To produce variations in the Hall current the speed control circuit 118 includes two inputs 182, 183 which modify the N-P-N base voltage and thereby alter the Hall current flowing in the device. A first input 182 is a control voltage from a control module and can be varied by the user to modify the base voltage. The second input 183 is also adjustable and provides a low signal adjustment which is added to the first input at a summing junction 187. The speed control 118 further comprises two amplifiers 184, 185 which transmit the inputs 182, 183 to the base of the N-P-N transistor.

From the above it should be apparent that the input 170 to the comparator 150 is a signal whose size depends not only on a desired speed or amplitude of the oscillation but also on the actual amplitude of oscillation as measured by the Hall transducer. Modifications of the signal 170 therefore occur in response to changes in the load in the feeder bowl as well as to changes introduced by the user through modification of the two speed control inputs 182, 183. In this way an amplitude sensing circuit control is employed which accurately produces a control signal dependent upon the amplitude of vibration even for small amplitudes which posed a problem for prior art amplitude sensing circuitry.

The comparator 150 compares its two input signals and produces an output. The comparator is configured such that when the input 168 from the sawtooth generator is greater than the input 170, the output 144 from the comparator will be high and current may pass through the optically coupled SCR 138. Conversely, whenever the input 168 is lower than the input 170, the output 144 will be low and the optically coupled SCR will not conduct. Thus when the sawtoothed waveform reaches a voltage above the waveform from the amplitude sensing circuit, the comparator 150 produces a high level output and the optically coupled SCR 138 sends a gating signal to the bowl drive SCR 130. This gating signal renders the bowl drive SCR 130 conductive, and the 120 volt alternating current source energizes the bowl coil and vibrates the bowl.

When the sawtoothed waveform drops below the amplitude sensing circuit waveform, the comparator 150 produces a low output and the optically coupled SCR is turned off. The gating signal to the bowl drive SCR 130 stops and the 120 volt alternating current source 113 no longer energizes the bowl coil. The affect of the comparison made by the comparator 150 is to render conductive the optically coupled SCR 138 during selective portions of the sawtooth waveform. Thus, if the sawtooth 168 is greater than the amplitude signal 170 for only a small portion of the alternating current cycle, the bowl coil will be energized for a short time and little power applied to the bowl. If the sawtooth 168 exceeds the amplitude signal 170 for a greater portion of the cycle, more power drives the feeder bowl.

As the load within the bowl changes, the portion of the AC cycle during which the bowl coil is energized varies to maintain constant amplitude vibrations. When a large number of parts are dumped from the supply hopper 16 to the vibratory bowl 20, the bowl must be driven with more power to achieve constant amplitude oscillation. This is achieved since the input 170 from the amplitude sensing circuit is lowered and the sawtooth waveform is greater than the output 170 for a longer time period which renders the optically coupled SCR 138 conductive for a longer time period. As this greater power achieves a larger amptitude, the amplitude signal 170 again increases and the time of conduction again decreases until a uniform amplitude of oscillation is achieved.

When the control voltage 119 is low, the first optically coupled SCR 138 stops gating the drive SCR and the braking circuit 114 begins to send signals to the power circuit to affirmatively damp the bowl mechanism. To achieve this damping, a braking SCR 132 allows current to flow through the bowl mechanism in a direction opposed to the positive bowl drive. When the brake SCR 132 is rendered conductive, therefore, a signal passes through the bowl coil which sets up electromagnetic interactions between the I and E laminations and damps motion of the feeder bowl 20.

The braking circuit 114 has two outputs 160, 148. The effect the output 160 has upon the comparator 152 has been described. The output 148 controls conduction of the second optically coupled SCR 140. When the control voltage 119 goes low, the output 146 of the midpoint comparator automatically goes high eliminating the possibility of conduction of the first optically coupled SCR 138 and permitting the second optically coupled SCR 140 to conduct depending upon the voltage level of the output 148.

During the time period in which the control voltage 119 is high and the bowl is being driven, the signal 160 passes to a capacitor 190 by means of diode 191. The diode 191 allows this signal to charge the capacitor 190 to a value of about 10 volts.

The voltage on the capacitor 190 forms the output 149 which is transmitted to the inverting input of a comparator amplifier 154. The non-inverting input 194 is connected to a variable voltage divider 196 which provides a means for adjusting the voltage on this non-inverting input. So long as the voltage 149 on the inverting input is greater than the non-inverting input the output 148 from this amplifier 154 is low.

Once the control voltage 119 goes low, however, the capacitor 190 begins to discharge since the contral voltage 119 is no longer maintaining its charge. This discharge is achieved through a resistor 198 connected between the output of the capacitor and ground. This discharge will continue until the voltage from the capacitor at the inverting input 149 becomes less than the voltage maintained on the noninverting input 194 due to action of the variable voltage divider 196. Throughout this time period of capacitor discharge, the output 148 is maintained in a low level. The input 146, however, to the power circuit is maintained at a high level once the control voltage goes low. During the time therefore, that the capacitor 190 is discharging, current is allowed to flow through the optically coupled SCR 140 which sends a gating signal 136 to the braking SCR 132. As long as the capacitor voltage output is above the reference voltage 194, a gating signal will appear at the SCR and the bowl coil can be driven in an opposed direction due to operation of that SCR. This bowl braking occurs in a sense opposite to the previous bowl drive and therefore damps oscillations due to the inertia and the less than optimum damping force provided by the leaf springs.

The values of the capacitor 190 and resistor 198 determine a time constant indicative of how long it takes the capacitor 190 to discharge that amount. By changing these discrete component values or adjusting the variable potential divider 196, it is possible for the user to "fine tune" the braking action of the apparatus.

In this regard it should be appreciated that if the braking signal is allowed to flow through the bowl coil too long a period of time, a braking action will occur but at some point the bowl will again be driven by the power source 113. For this reason the voltage divider 196 must be adjusted to allow the comparator output 148 to be at a low level for only an appropriate period of time, neither too short to effectively brake nor too long to overdrive the system.

To more completely appreciate the combined amplitude sensing and speed control achieved through utilization of the "Hall Effect" transducer it is instructive to examine the voltage wave forms at selective junctions of the control circuit 110. FIGS. 8A-8E show waveforms for two different amplitudes of bowl vibration. The solid line in these figures corresponds to voltage wave forms which provide an oscillation of approximately 0.075 inches of peak to peak bowl vibration. The dotted line corresponds to wave forms which provide an oscillation of approximately 0.125 inches of peak to peak bowl vibration.

Figure 8A:
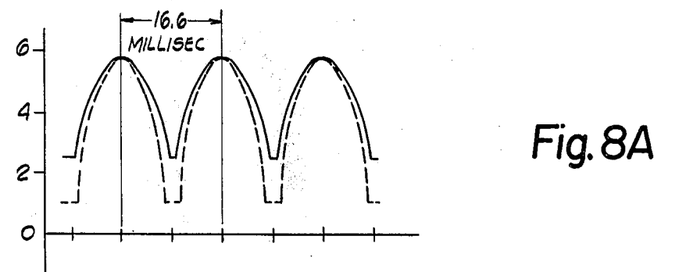
FIGS. 8A–8E show voltage waveforms at certain locations of the control circuit of FIG. 7.

FIG. 8A illustrates the voltage difference across the two Hall Effect transducer outputs as a function of time. These inputs are sent to the amplifier 172 for transmission to the other pulse forming components within the circuitry. All other wave forms (8B-8E) are shown on identical time bases. The output from the Hall Effect transducer diminishes for increased bowl vibration. The peak voltage output from the Hall Effect transducer remains at approximately 6 volts for all amplitudes but as vibration amplitudes increase the minimum voltage on the Hall Effect transducer waveform decreases. As noted previously this wave form is amplified by the amplifier 172 and transmitted to the comparator 174.

Figure 8B:
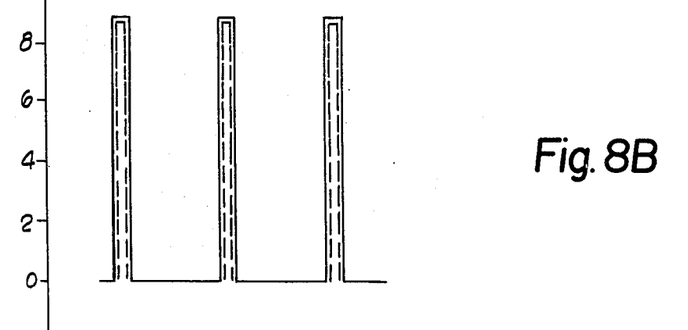
Figure 8C:
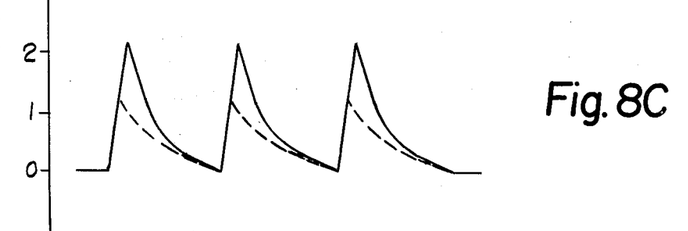

The output from the comparator 174 is illustrated in FIG. 8B. The wave form illustrated corresponds to an output in which a reference inverting input 177 to the comparator 174 is set at approximately 5.9 volts. Whenever the Hall Effect amplifier output exceeds this 5.9 volt setting the comparator amplifier 174 produces an output of approximately 9 volts. Thus as the Hall Effect output decreases the comparator amplifier output also decreases due to the fact that the Hall transducer output is greater than the reference voltage for a smaller period of time. The comparator pulse width for the 0.075 inch vibration (solid line) is approximately 2 milliseconds and the pulse width for the 0.125 inch vibration (dotted line) is approximately 1 millisecond.

The output from the comparator amplifier 174 is integrated by an integrator 176 and transmitted to the inverting input of an amplifier 150. This integrated wave form appears in FIG. 8C as a sharply rising voltage followed by a more gradually sloping decrease in voltage. The increasing portion of the wave form has approximately the same slope for both the small and large amplitudes of vibration but the integrated waveform for the large amplitude results in a more gradually sloping decrease in integrated signal from a peak voltage substantially less than the waveform for the small amplitude of oscillation.

Figure 8D:
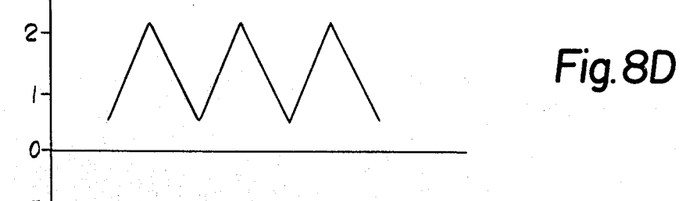
Figure 8E:
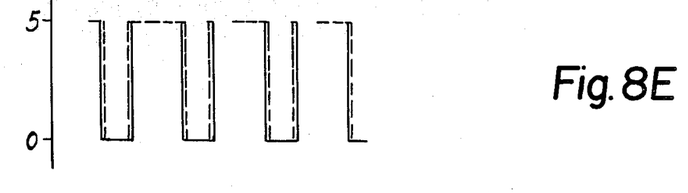

The integrated wave form is compared to a sawtooth wave form which is illustrated in FIG. 8D. As noted above, the output from the comparator 150 is high whenever the sawtooth wave form (FIG. 8D) is greater than the integrated wave form. Since the sawtooth wave form is constant in shape and amplitude it is modulation of the integrated wave form which results in different outputs from the comparator 150. As the integrated wave form decreases (corresponding to an increase in amplitude) the sawtooth is greater than the integrated wave form for a longer period of time and therefore the comparator output 144 is high for a greater duration therefore rendering conductive the drive SCR 130 for a longer time period. The increase in conduction of this drive SCR 130 results in a greater amplitude of oscillation as desired. For a low amplitude of oscillation (solid line in FIGS. 8A-E) the integrated wave form is substantially larger and the comparison between it and the sawtooth wave form results in a shorter duration of on time for the comparator output. In FIG. 8E the 0.075 inch amplitude is produced by an on time per cycle of approximately 11 milliseconds and the 0.125 inch amplitude by an on time per cycle of approximately 13 milliseconds.

It is apparent from FIGS. 8A-E that by adjusting the Hall amplitude output through modification of the speed input it is possible therefore to selectively control the time period in which the drive SCR is rendered conductive. Changes in load produce changes which also cause the comparator 150 to temporarily change the gating of the drive SCR 130 until such changes again cause the system to reach an equilibrium vibration condition.

While the unique and novel material handling apparatus and braking system have been described with particularity, it should be appreciated that certain modifications could be incorporated without departing from the spirit or scope of the invention as set forth in the appended claims.

What is claimed is:

1. A vibratory feeder comprising:
    (a) a feeder element mounted for vibratory motion relative to a fixed base, said element comprising mechanical structure for feeding articles therefrom in response to vibratory motion of said element;
    (b) electromagnetic power means coupled to vibrate the feeder element at a frequency which is a function of an AC line frequency couplable to the power means; and
    (c) a braking control circuit coupled to the power means for, in response to occurrence of a stop command, causing the power means to apply energy from the line to the element in pulses at approximately said vibration frequency and timed to actively counteract continued vibratory movement.

2. The vibratory feeder of claim 1, where: said power means comprises an AC motor coupled to vibrate said feeder element at substantially the alternating current line frequency.

3. A vibratory feeder comprising:

(a) a receptacle mounted for vibratory motion and for holding articles to be fed from the receptacle in response to the vibratory motion;

(b) an electric driver couplable to an AC power source to apply force to the receptacle in synchrony with the line frequency for vibrating the receptacle at a steady state frequency which is a function of the alternating line frequency applied to the driver;

(c) a reference generator for producing a periodic time varying reference signal representing said steady state frequency and a reference vibration amplitude;

(d) a detector system for producing a waveform which is a function of actual frequency of receptacle vibration, actual phase and amplitude of such vibration, and an independently variable predetermined amplitude of vibration of the receptacle;

(e) power control circuitry including comparator circuitry coupled between the detector, reference generator and the driver and comprising:

(i) circuitry responsive to the detector and reference generator for causing the driver to apply power in a relatively high range to increase vibratory motion of the receptacle when one of said detected frequency and amplitude of vibration is less than said steady state frequency and predetermined amplitude, respectively, and (ii) circuitry responsive to said detector and said reference generator for reducing the power applied by the driver to vibrate the receptacle when the amplitude and frequency of receptacle vibration reach said predetermined amplitude and steady state frequency, respectively.

4. The vibratory feeder of claim 3, wherein:

said detector comprises a Hall effect transducer and a magnet affixed to the receptacle for cooperatively sensing instantaneous mechanical displacement of at least a portion of said receptacle at a predetermined portion of the receptacle.

5. A vibratory feeder apparatus comprising:

(a) a feeder element for guiding movement of articles therein in response to vibration of the feeder element;

(b) electromagnetic drive means coupled to said feeder and responsive to application of electric drive energy from a line to impart vibration to said element, and (c) braking means including circuitry responsive to further application of electric drive energy for causing the drive means to apply power in pulses from the line to actively oppose vibration of the feeder element in substantial synchrony against such vibration.

6. The feeder of claim 5, wherein:

(a) said drive means is couplable to an alternating source of line energy, and (b) said braking means comprises circuitry for applying braking force to the feeder element in synchrony with the alternating line energy.

7. A vibratory feeder apparatus comprising:

(a) a feeder element for feeding articles therefrom in response to vibratory motion of the feeder element;

(b) electromagnetic drive means coupled to the feeder element and couplable to an alternating current electrical power line for applying power from substantially only one polarity of half cycles of said alternating electric line energy for vibrating the feeder element, and (c) braking circuitry including gating means coupled to the electromagnetic drive means for applying braking power from the line to oppose vibration of the feeder element, said power being drawn from substantially only those AC half cycles having a polarity opposite the polarity of the half cycles utilized in vibrating the feeder element.

8. A method of vibratory feeding comprising the steps of:

(a) vibrating a feeder element substantially synchronously with alternating current power from a line, and (b) in response to the occurrence of a stop command signal, applying energy from the alternating current line in pulses synchronous with the AC line frequency for opposing actively continued vibratory movement of the feeder element.

9. A method of vibratory feeding comprising the steps of:

(a) applying force to a feeder receptacle in synchrony with the line frequency of an AC power source for vibrating the receptacle at a steady state frequency which is a function of the alternating line frequency applied to drive the receptacle;

(b) producing a reference signal representing said steady state frequency and a reference vibration amplitude;

(c) producing a waveform which is a function of actual frequency of receptacle vibration, actual phase and amplitude of such vibration and an independently variable predetermined amplitude of vibration of the receptacle;

(d) causing, in response to comparison of said waveform and said reference signal, the application of power in a relatively high range to increase vibratory motion of the receptacle when one of said actual frequency and amplitude of vibration is less than said steady state frequency and predetermined amplitude, respectively, and (e) in response to further comparison of said reference signal and said waveform, reducing the power applied to vibrate the receptacle when the amplitude and frequency of receptacle vibration reach said predetermined amplitude and steady state frequency, respectively.

10. A vibratory feeder comprising:

(a) a receptacle mounted for vibratory motion and having structure for holding articles to be fed therefrom in response to vibratory motion of the receptacle;

(b) drive means for vibrating the receptacle;

(c) a detector coupled to the receptacle comprising:

(i) circuitry for producing a signal indicating instantaneous displacement of at least a portion of the receptacle with respect to a predetermined location;

(ii) circuitry for differentiating and integrating said instantaneous displacement signal for producing a waveform indicating both actual amplitude and frequency of receptacle vibration, and (iii) circuitry for adjusting the amplitude of said waveform, and (d) control circuitry responsive to the detector for controlling operation of the motor.

* * * * *

UNITED STATES PATENT AND TRADEMARK OFFICE
CERTIFICATE OF CORRECTION

PATENT NO. : 4,350,243
DATED : September 21, 1982
INVENTOR(S) : Ronald Weyandt

It is certified that error appears in the above-identified patent and that said Letters Patent is hereby corrected as shown below:

Column 5, line 5, "now" should be --not--.

Signed and Sealed this

Twenty-third Day of November 1982

[SEAL]

Attest:

GERALD J. MOSSINGHOFF

Attesting Officer     Commissioner of Patents and Trademarks